United States Patent
Kawahara et al.

(10) Patent No.: US 10,248,853 B2
(45) Date of Patent: Apr. 2, 2019

(54) IMAGE OUTPUT DEVICE, IMAGE OUTPUT METHOD, AND COMPUTER PROGRAM PRODUCT

(71) Applicant: Kabushiki Kaisha Toshiba, Minato-ku, Tokyo (JP)

(72) Inventors: Tomokazu Kawahara, Yokohama Kanagawa (JP); Tatsuo Kozakaya, Kawasaki Kanagawa (JP); Osamu Yamaguchi, Yokohama Kanagawa (JP); Mayumi Yuasa, Ota Tokyo (JP); Tomoki Watanabe, Inagi Tokyo (JP); Mayu Okumura, Kawasaki Kanagawa (JP); Viet quoc Pham, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 14/977,280

(22) Filed: Dec. 21, 2015

(65) Prior Publication Data

US 2016/0117839 A1    Apr. 28, 2016

Related U.S. Application Data

(63) Continuation of application No. PCT/JP2014/059056, filed on Mar. 20, 2014.

(30) Foreign Application Priority Data

Jun. 25, 2013    (JP) ................................. 2013-132887

(51) Int. Cl.
*G06K 9/00*    (2006.01)
*H04N 7/18*    (2006.01)
(Continued)

(52) U.S. Cl.
CPC ...... *G06K 9/00335* (2013.01); *G06K 9/00348* (2013.01); *G06T 7/231* (2017.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 4,547,800 A | * | 10/1985 | Masaki | G01B 11/022 348/90 |
| 5,982,953 A | * | 11/1999 | Yanagita | G06F 19/321 348/580 |

(Continued)

FOREIGN PATENT DOCUMENTS

| | | |
|---|---|---|
| JP | 2002-027395 | 1/2002 |
| JP | 2007-006324 A | 1/2007 |

(Continued)

OTHER PUBLICATIONS

Background Art Information provided by Toshiba, Aug. 2, 2013—2 pages.

(Continued)

*Primary Examiner* — Anand P Bhatnagar
(74) *Attorney, Agent, or Firm* — Knobbe, Martens, Olson & Bear, LLP

(57) ABSTRACT

According to an embodiment, an image output device includes an extractor, a search unit, an associate unit, and a controller. The extractor is configured to extract a first parameter that varies in accordance with a movement of an object from at least one first image of the object, and extract a second parameter that varies in accordance with a movement of the object from each second image of the object. The search unit is configured to search for a second parameter similar to the first parameter. The associate unit is configured
(Continued)

to associate the first image from which the first parameter is extracted with the second image from which the second parameter that is retrieved with respect to the first parameter is extracted. The controller is configured to instruct an output unit to output an image based on the first and second images that are associated to each other.

15 Claims, 11 Drawing Sheets

(51) Int. Cl.
G06T 7/33 (2017.01)
G06T 7/38 (2017.01)
G06T 7/231 (2017.01)
G06T 7/246 (2017.01)

(52) U.S. Cl.
CPC .............. *G06T 7/248* (2017.01); *G06T 7/337* (2017.01); *G06T 7/38* (2017.01); *H04N 7/18* (2013.01); *G06T 2207/30196* (2013.01); *G06T 2207/30241* (2013.01)

(56) References Cited

U.S. PATENT DOCUMENTS

| | | | | |
|---|---|---|---|---|
| 6,031,568 A * | 2/2000 | Wakitani | ................... | G06T 7/20 348/169 |
| 7,440,691 B2 * | 10/2008 | Beniyama | ................ | G03D 9/02 396/325 |
| 7,489,806 B2 * | 2/2009 | Mohri | .................... | G06F 3/014 382/103 |
| 7,860,276 B2 * | 12/2010 | Anai | ......................... | G06T 7/33 382/107 |
| 8,447,114 B2 | 5/2013 | Watanabe et al. | | |
| 9,210,477 B2 * | 12/2015 | Pacor | ............... | H04N 21/21805 |
| 9,541,509 B2 * | 1/2017 | Akahori | ................. | A61B 6/486 |
| 2005/0105828 A1 * | 5/2005 | Oosawa | ................. | A61B 6/032 382/294 |
| 2005/0201638 A1 * | 9/2005 | Cha | .......................... | G06T 7/60 382/286 |
| 2009/0046152 A1 * | 2/2009 | Aman | ................ | A63B 24/0021 348/157 |
| 2009/0060352 A1 * | 3/2009 | Distante | ............. | A63B 24/0021 382/224 |
| 2010/0128927 A1 * | 5/2010 | Ikenoue | ............. | G06K 9/00261 382/103 |
| 2011/0221890 A1 * | 9/2011 | Yamashita | .............. | G06T 7/248 348/135 |
| 2012/0089949 A1 * | 4/2012 | Chen | ...................... | G06F 3/005 715/848 |
| 2013/0050502 A1 * | 2/2013 | Saito | ......................... | G06T 7/20 348/169 |
| 2017/0178352 A1 * | 6/2017 | Harmsen | ................. | G06T 7/579 |

FOREIGN PATENT DOCUMENTS

| | | |
|---|---|---|
| JP | 2008-199549 A | 8/2008 |
| WO | WO 2011/102416 A1 | 8/2011 |

OTHER PUBLICATIONS

T. Watanabe, et al., "Co-occurrence Histograms of Oriented Gradients for Human Detection," IPSJ Transaction on Computer Vision and Applications vol. 2, Mar. 2010, pp. 39-47.

T. Mita, et al., "Discriminative Feature Co-Occurrence Selection for Object Detection," IEEE Transactions on Pattern Analysis and Machine Intelligence vol. 30, No. 7, Jul. 2008, pp. 1257-1269.

International Search Report Written Opinion and Written Opinion issued by Japan Patent Office dated Apr. 15, 2014 in the corresponding PCT Application No. PCT/JP2014/059056—6 pages.

* cited by examiner

FIG.3

| FIRST IMAGE NUMBER | EXTRACTION RESULT |
|---|---|
| A1 | wA1, hA1 |
| A2 | wA2, hA2 |
| A3 | wA3, hA3 |
| ⋮ | ⋮ |
| AN | wAN, hAN |

FIG.4

| SECOND IMAGE NUMBER | EXTRACTION RESULT |
|---|---|
| B1 | wB1, hB1 |
| B2 | wB2, hB2 |
| B3 | wB3, hB3 |
| ⋮ | ⋮ |
| BM | wBM, hBM |

| FIRST IMAGE NUMBER | SECOND IMAGE NUMBER |
|---|---|
| A1 | B11 |
| A2 | B12 |
| A3 | B13 |
| ⋮ | ⋮ |

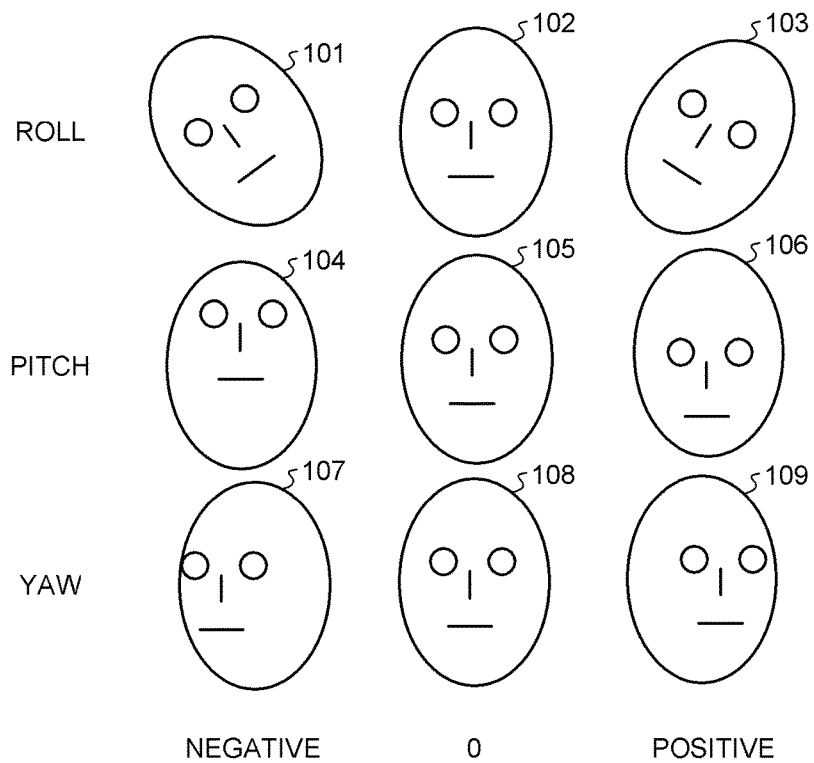

| FIRST IMAGE NUMBER | EXTRACTION RESULT |
|---|---|
| E1 | s1 |
| E2 | s2 |
| E3 | s3 |
| ⋮ | ⋮ |
| EN | sN |

| FIRST IMAGE NUMBER | EXTRACTION RESULT |
|---|---|
| G1 | d1 |
| G2 | d2 |
| G3 | d3 |
| ⋮ | ⋮ |
| GN | dN |

IMAGE OUTPUT DEVICE, IMAGE OUTPUT METHOD, AND COMPUTER PROGRAM PRODUCT

CROSS-REFERENCE TO RELATED APPLICATION

This application is a continuation of PCT international Application Ser. No. PCT/JP2014/059056, filed on Mar. 20, 2014, which designates the United States and which claims the benefit of priority from Japanese Patent Application No. 2013-132887, filed on Jun. 25, 2013; the entire contents of which are incorporated herein by reference.

FIELD

Embodiments described herein relate generally to an image output device, an image output method, and a computer program product.

BACKGROUND

A technology is known in which a plurality of movie sequence is displayed next to each other so as to enable visual identification of whether or not it is the same person who is captured in the movie sequence. Moreover, in order to facilitate identification of a particular person who is to be identified, a technology is known in which that particular person is tracked in the movie sequence; a plurality of images is extracted that captures different orientations of the face of that particular person; and then the extracted images are displayed next to each other.

Regarding a mobile object, information that is beneficial in the identification of that mobile object, such as the information on the mannerisms of that mobile object, becomes easily available in the movements made by that mobile object. However, in the conventional technology described above, while visually identifying whether or not it is the same mobile object that is captured in a plurality of images, no thought is given to the movements made by that mobile object.

BRIEF DESCRIPTION OF THE DRAWINGS

FIG. 3 is a diagram illustrating an example of first parameters according to the embodiment.

FIG. 4 is a diagram illustrating an example of second parameters according to the embodiment.

FIG. 9 is a diagram illustrating an example of face orientation extraction performed according to a first modification example.

FIG. 10 is a diagram illustrating an example of first parameters according to the first modification example.

DETAILED DESCRIPTION

According to an embodiment, an image output device includes an acquirer, an extractor, a search unit, an associate unit, and an output controller. The acquirer is configured to acquire a plurality of first images obtained by capturing a mobile object in a first chronological order and a plurality of second images obtained by capturing the mobile object. The extractor is configured to extract a first parameter that varies in accordance with a movement of the mobile object from at least one of the first images, and extract a second parameter that varies in accordance with a movement of the mobile object from each of the second images. The search unit is configured to search the second parameters for a second parameter that is similar to the first parameter. The associate unit is configured to associate the first image from which the first parameter is extracted with the second image from which the second parameter that is retrieved with respect to the first parameter is extracted. The output controller is configured to instruct an output unit to output an image based on the first image and the second image that are associated to each other.

An exemplary embodiment of the invention is described below in detail with reference to the accompanying drawings.

Figure 1:
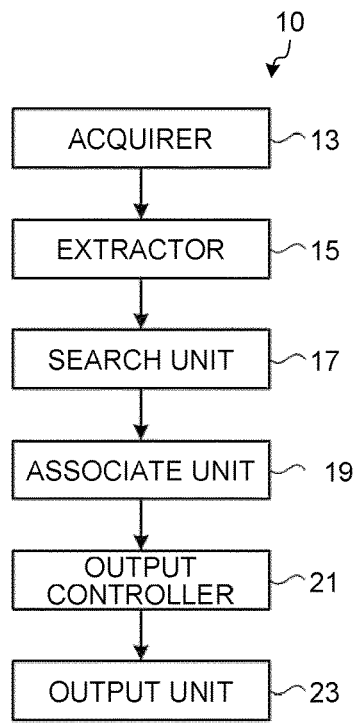
FIG. 1 is a configuration diagram illustrating an example of an image output device according to an embodiment.

FIG. 1 is a configuration diagram illustrating an example of an image output device 10 according to the embodiment. As illustrated in FIG. 1, the image output device 10 includes an acquirer 13, an extractor 15, a search unit 17, an associate unit 19, an output controller 21, and an output unit 23.

The acquirer 13, the extractor 15, the search unit 17, the associate unit 19, and the output controller 21 can be implemented by executing computer programs in a processor such as a central processing unit (CPU), that is, can be implemented using software; or can be implemented using hardware such as an integrated circuit (IC); or can be implemented using a combination of software and hardware. The output unit 23 can be implemented using, for example, a display device such as a liquid crystal display. Alternatively, the output unit 23 can be implemented using a communication device such as a network interface card (NIC).

The acquirer 13 acquires a plurality of first images, which capture a mobile object in a first chronological order, and acquires a plurality of second images, which capture the same mobile object. In the embodiment, it is assumed that the first images and the second images are taken using monitoring cameras or security cameras that are installed throughout the town. However, that is not the only possible case. Meanwhile, the first images and the second images can either be movie sequence or be still images.

Moreover, in the embodiment, it is assumed that the first images and the second images are stored in a storage unit (not illustrated) of the image output device 10, and the acquirer 13 acquires the images from the storage unit. However, that is not the only possible case. Alternatively, the acquirer 13 can acquire the first images and the second images directly from the monitoring cameras via a network. Still alternatively, an external storage unit for storing the first images and the second images can be installed on the outside of the image output device 10 (for example, on the cloud), and the acquirer 13 can acquire the images from that external storage unit. Herein, the external storage unit can be implemented using, for example, a hard disk drive (HDD) or a solid state drive (SSD).

Furthermore, in the embodiment, it is assumed that the second images capture a mobile object in a second chronological order. However, that is not the only possible case. Alternatively, the second images may not capture the mobile object in a chronological order. Herein, it is desirable that the first chronological order is different than the second chronological order. As long as the first chronological order is different than the second chronological order, the monitoring cameras capturing the first images and the monitoring cameras capturing the second images may be the same monitoring cameras or different monitoring cameras. Meanwhile, in the embodiment, although the mobile object is assumed to be a person, it is not the only possible case.

The extractor 15 extracts, from at least one of the first images acquired by the acquirer 13, a first parameter that varies in accordance with the movements made by a person. Moreover, the extractor 15 extracts, from each second image acquired by the acquirer 13, a second parameter that varies in accordance with the movements made by a person. In the embodiment, it is assumed that the extractor 15 acquires the first parameter from each first image acquired by the acquirer 13.

Herein, the first parameters and the second parameters are parameters related to a body part of a person. Examples of such parameters include the size of a body part captured in an image, the orientation of a body part captured in an image, and a relative position of a body part captured in an image. Thus, the first parameters and the second parameters can represent at least either one of these examples. However, that is not the only possible case. Herein, since the size of a body part captured in an image is dependent on the distance between the monitoring camera that took the image and the person captured in the image, the size varies in accordance with the movements made by the person. Examples of a body part include the face, legs, the trunk, the whole body, the upper body, the lower body, hands, and arms. Thus, as long as the body part represents at least one of these examples, it serves the purpose. However, that is not the only possible case.

In the embodiment, the explanation is given for an example in which the first parameters and the second parameters represent the sizes of the face of the person captured in the images. In this case, the extractor 15 acquires a face area (in the embodiment, assumed to be a rectangular area indicating the face) from each first image; and sets the horizontal width and the height of the face area as the first parameter. In an identical manner, the extractor 15 acquires a face area from each second image; and sets the horizontal width and the height of the face area as the second parameter. Herein, as long as a first parameter as well as a second parameter includes at least the horizontal width and the height of the face area, it serves the purpose. Besides, the first parameters and the second parameters can also include some other information (such as an identifier of the source image for extraction).

Figure 2:
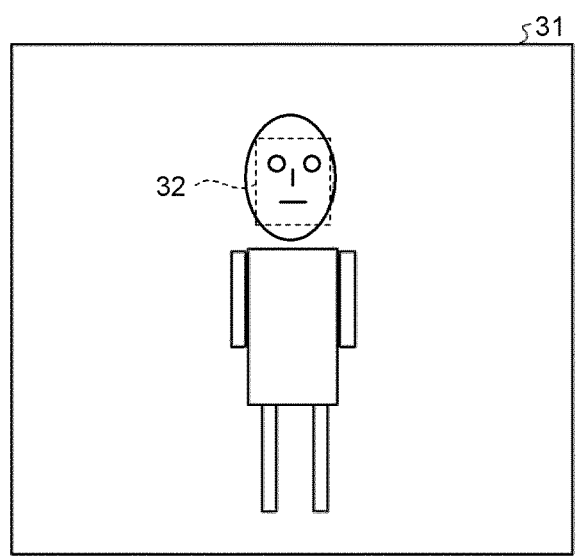
FIG. 2 is a diagram illustrating an example of face area extraction performed according to the embodiment.

FIG. 2 is a diagram illustrating an example of face area extraction performed according to the embodiment. In the example illustrated in FIG. 2, from an image 31, the extractor 15 extracts an area 32 as the face area. Herein, the face area extraction can be performed by implementing, for example, the method disclosed in Takeshi Mita, Toshimitsu Kaneko, Bjorn Stenger, Osamu Hori: "Discriminative Feature Co-Occurrence Selection for Object Detection". IEEE Transaction Pattern Analysis and Machine Intelligence Volume 30, Number 7, July 2008, pp. 1257-1269 (hereinafter, referred to as "reference literature 1"). Meanwhile, extraction of a body area can be performed by implementing, for example, the method disclosed in Tomoki Watanabe, Satoshi Ito, Kentaro Yoko: "Co-occurrence Histogram of Oriented Gradients for Human Detection", IPSJ Transaction on Computer Vision and Applications Volume 2 Mar. 2010, pp. 39-47 (hereinafter, referred to as "reference literature 2").

FIG. 3 is a diagram illustrating an example of first parameters according to the embodiment. FIG. 4 is a diagram illustrating an example of second parameters according to the embodiment. In the examples illustrated in FIGS. 3 and 4, each parameter represents information in which an image number, which represents the identifier of a source image for extraction of the face area, is associated to the face area extraction result (the horizontal width and the height of the face area). Herein, "w" represents the horizontal width of the face area, and "h" represents the height of the face area. Moreover, "N" as well as "M" is a positive integer equal to or greater than two.

The search unit 17 searches among a plurality of second parameters, which are extracted by the extractor 15, for the second parameter that is similar to the first parameter extracted by the extractor 15. In the embodiment, for each first parameter extracted by the extractor 15, the search unit 17 searches among a plurality of second parameters for the second parameter that is similar to the first parameter.

More particularly, the search unit 17 searches among a plurality of second parameters for the second parameter for which the distance, which represents the degree of similarity, to the first parameter is the shortest. For example, for each first parameter, the search unit 17 calculates the distance, which represents the degree of similarity, to each of a plurality of second parameters using Equation (1) given below and searches for the second parameter for which the calculated distance is the shortest.

$$D=(wAx-wBz)^2+(hAx-hBz)^2 \qquad (1)$$

Herein, wAx represents the horizontal width of the face area of the first parameter, hAx represents the height of the face area of the first parameter, wBz represents the horizontal width of the face area of the second parameter, and hBz represents the height of the face area of the second parameter. Moreover, "x" is an arbitrary positive integer between 1 to N, and "z" is an arbitrary positive integer between 1 to M.

The associate unit 19 associates the source first image for extraction of a first parameter with the source second image for extraction of the second parameter that is retrieved with respect to that first parameter by the search unit 17. In the embodiment, for each first parameter, the associate unit 19 associates the source first image for extraction of the first parameter with the source second image for extraction of the second parameter that is retrieved with respect to the first parameter by the search unit 17.

Figures 5, 6:
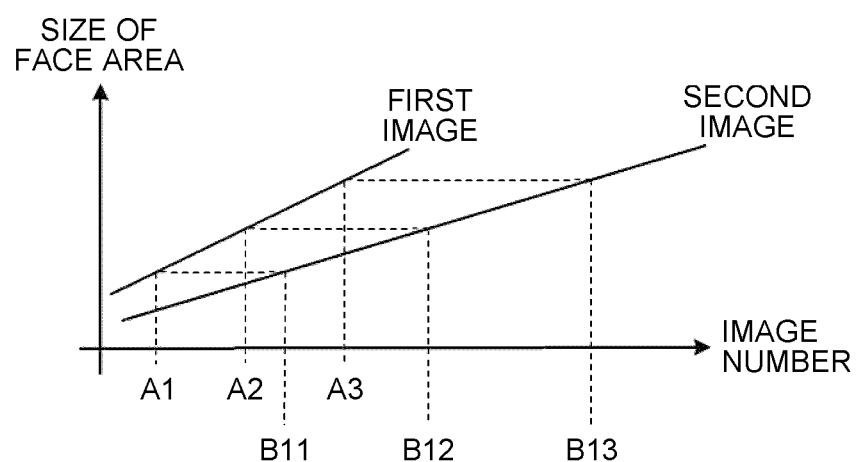
FIG. 5 is a graph illustrating the correspondence between a first image and a second image that capture face areas having the closest size to each other.
FIG. 6 is a diagram illustrating an example of the result of associating the first images and the second images according to the embodiment.

For example, a result of the search performed by the search unit 17 is illustrated as a graph in FIG. 5. The graph represents the second parameters that are retrieved with respect to the first parameters. That is, the graph represents the correspondence between the source first images for extraction of the first parameters and such second images that capture face areas having the closest size to the size of the face areas captured in the first images.

In this case, as illustrated in FIG. 6, the associate unit 19 associates the first image having a first image number A1 with the second image having a second image number B11; associates the first image having a first image number A2 with the second image having a second image number B12; and associates the first image having a first image number A3 with the second image having a second image number B13.

The output controller 21 instructs the output unit 23 to output images based on the first images and the second images associated to each other by the associate unit 19. In the embodiment, the output controller 21 instructs the output unit 23 to sequentially output the images that are based on the sets of a first image and a second image associated to each other according to the first-chronological order or the second chronological order.

Herein, regarding images based on the sets of first images and second images associated to each other, an example includes images in which first images and second images are arranged next to each other. As far as the arrangement is concerned, for example, a first image and a second image can be arranged side by side or can be arranged one above the other.

Figure 7:
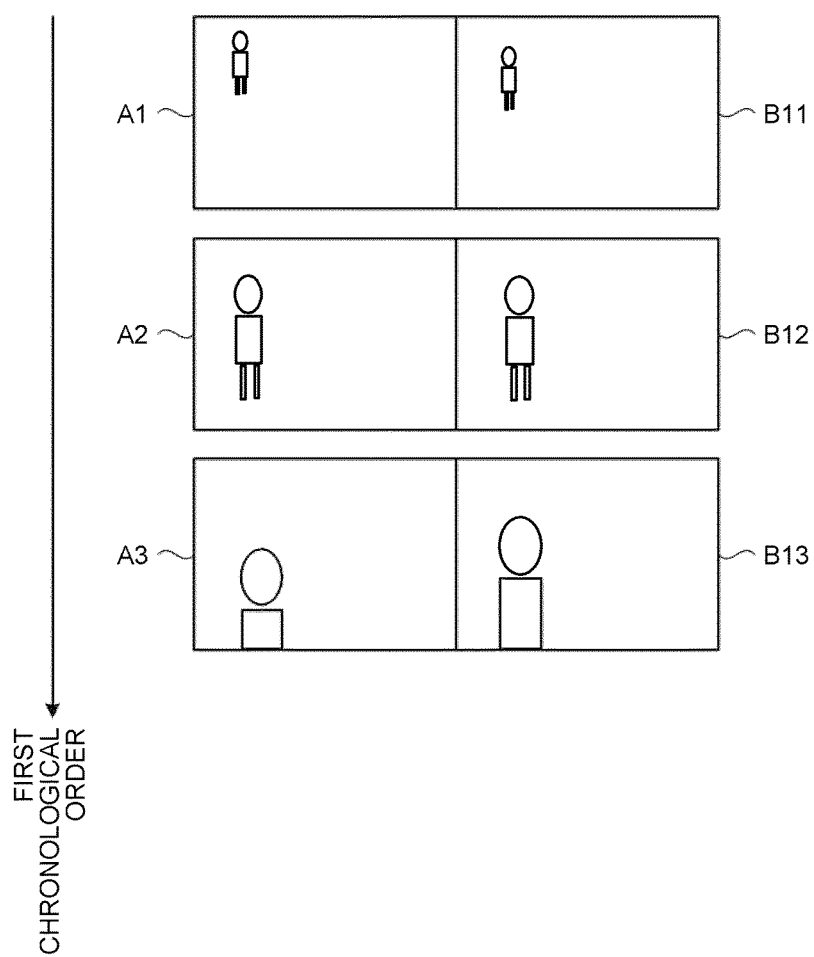
FIG. 7 is a diagram illustrating an output example according to the embodiment.

FIG. 7 is a diagram illustrating an output example according to the embodiment. In the example illustrated in FIG. 7, the output controller 21 instructs the output unit 23 to sequentially output, on a screen, an image in which the first image having the first image number A1 and the second image having the second image number B11 that are associated to each other by the associate unit 19 are arranged side by side; an image in which the first image having the first image number A2 and the second image having the second image number B12 that are associated to each other by the associate unit 19 are arranged side by side; and an image in which the first image having the first image number A3 and the second image having the second image number B13 that are associated to each other by the associate unit 19 are arranged side by side, in that sequence (in the first chronological order).

As a result, it becomes possible to output images that include the movements made by a person captured in a plurality of first images and include the movements made by a person captured in a plurality of second images. Hence, it becomes possible to facilitate visual identification of whether or not the person captured in a plurality of first images is the same person who is captured in a plurality of second images.

Meanwhile, in the case when a plurality of output units 23 is arranged or when the output unit 23 performs the output on a plurality of screens (for example, performs the output on a plurality of windows); the output controller 21 can control the output in such a way that the sets of a first image and a second image that are associated to each other need not be arranged together, and the timing at which the first images and the second images that are associated to each other are output to the output unit 23 is matched. In this case, an image based on the set of a first image and a second image represents nothing but the first image and the second image.

Figure 8:
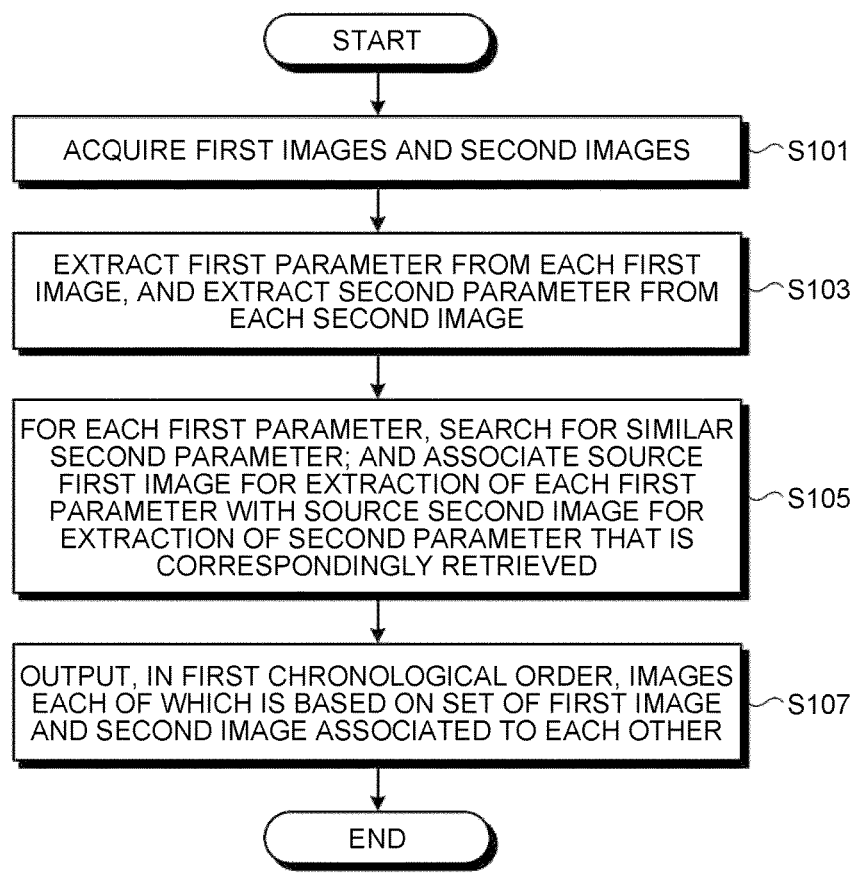
FIG. 8 is a flowchart for explaining an example of the operations performed according to the embodiment.

FIG. 8 is a flowchart for explaining an example of the operations performed in the image output device 10 according to the embodiment.

Firstly, the acquirer 13 acquires a plurality of first images, which capture a mobile object in a first chronological order, and acquires a plurality of second images, which capture the same mobile object (Step S101).

Then, the extractor 15 extracts, from each first image acquired by the acquirer 13, a first parameter that varies in accordance with the movements made by the person; and extracts, from each second image acquired by the acquirer 13, a second parameter that varies in accordance with the movements made by the person (Step S103).

Subsequently, for each first parameter extracted by the extractor 15, the search unit 17 searches among the second parameters, which are extracted by the extractor 15, for the second parameter that is similar to the first parameter. Then, for each first parameter, the associate unit 19 associates the source first image for extraction of that first parameter with the source second image for extraction of the second parameter that is retrieved with respect to the first parameter (Step S105).

Then, the output controller 21 instructs the output unit 23 to sequentially output images, each of which is based on a set of the first image and the second image that are associated to each other by the associate unit 19, in the first chronological order (Step S107).

In this way, according to the embodiment, it becomes possible to output images that include the movements made by a person captured in a plurality of first images and include the movements made by a person captured in a plurality of second images. Hence, it becomes possible to facilitate visual identification of whether or not the person captured in a plurality of first images is the same person who is captured in a plurality of second images.

First Modification Example

In the embodiment, the explanation is given for an example in which the sizes of the face of a person captured in the images are considered to be the first parameters and the second parameters. In contrast, in a first modification example, the explanation is given for an example in which the orientations of the face of a person captured in the images are considered to be the first parameters and the second parameters.

In this case, the extractor 15 extracts the face area from each of a plurality of first images, and sets the orientation of the face in each face area as the first parameter. In an identical manner, the extractor 15 extracts the face area from each of a plurality of second images, and sets the orientation of the face in each face area as the second parameter.

FIG. 9 is a diagram illustrating an example of face orientation extraction performed according to the first modification example. In the example illustrated in FIG. 9, the extractor 15 extracts the face orientation as a continuous quantity of roll/pitch/yaw. Herein, the roll represents the angle of in-screen turning with the frontward orientation as the reference; the pitch represents the angle of vertical turning with the frontward orientation as the reference; and the yaw represents the angle of sideways turning with the frontward orientation as the reference. However, the face orientation is not limited to this example. Alternatively, the face orientation can include the frontward orientation, the rightward orientation, the leftward orientation, the upward orientation, or the downward orientation.

In the example illustrated in FIG. 9, a face 101 indicates the face orientation in the case when the roll value is a negative value; a face 102 indicates the face orientation in the case when the roll value is equal to zero; and a face 103 indicates the face orientation in the case when the roll value is a positive value. Similarly, a face 104 indicates the face orientation in the case when the pitch value is a negative value; a face 105 indicates the face orientation in the case when the pitch value is equal to zero; and a face 106 indicates the face orientation in the case when the pitch value is a positive value. Moreover, a face 107 indicates the face orientation in the case when the yaw value is a negative value; a face 108 indicates the face orientation in the case when the yaw value is equal to zero; and a face 109 indicates the face orientation in the case when the yaw value is a positive value. Meanwhile, the orientation extraction can be performed by implementing, for example, the method disclosed in reference literature 1 or reference literature 2 mentioned above. If the faces are oriented in the same direction, then it becomes easier to identify whether the faces are of the same person by checking whether the faces match with each other or whether the appearance of a particular part of each face is identical. For example, regarding noses that do not necessarily match from the structural perspective; instead of comparing the noses from different directions, comparison of the noses from the same direction makes it easier to perform identification. Moreover, even in the case when a hidden area is present, matching the directions leads to uniformity in appearance thereby making it possible to effectively use the visible area. Meanwhile, as long as the faces can be oriented in the direction of one of the images, it serves the purpose. In the case when there is no hidden area (invisible area) or when the faces can be oriented in any direction, it is desirable that the faces are oriented close to the frontward orientation so that the face orientations match with each other and the roll/pitch/yaw values are close to zero. That makes it easier to perform identification.

FIG. 10 is a diagram illustrating an example of first parameters according to the first modification example. In the example illustrated in FIG. 10, each parameter represents information in which an image number, which represents the identifier of a source image for extraction of the face area, is associated to the extraction result (roll/pitch/yaw) of the face orientation of that face area. Herein, "r" represents the roll, "p" represents the pitch, and "y" represents the yaw.

Herein, the search unit 17 and the associate unit 19 can perform operations in an identical manner to the operations explained earlier in the embodiment.

Figure 11:
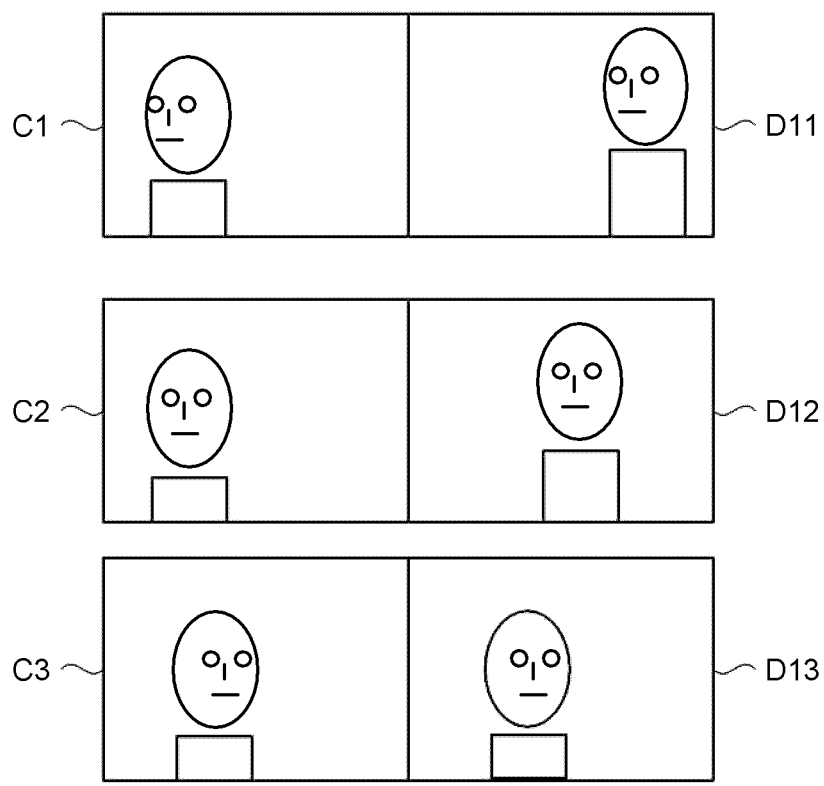
FIG. 11 is a diagram illustrating an output example according to the first modification example.

FIG. 11 is a diagram illustrating an output example according to the first modification example. In the example illustrated in FIG. 11, the output controller 21 instructs the output unit 23 to sequentially output, on a screen, an image in which the first image having a first image number C1 and the second image having a second image number D11 that are associated to each other by the associate unit 19 are arranged side by side; an image in which the first image having a first image number C2 and the second image having a second image number D12 that are associated to each other by the associate unit 19 are arranged side by side; and an image in which the first image having a first image number C3 and the second image having a second image number D13 that are associated to each other by the associate unit 19 are arranged side by side, in that sequence (in the first chronological order).

As a result, it becomes possible to output images that include the face movements made by a person captured in a plurality of first images and include the face movements made by a person captured in a plurality of second images. Hence, it becomes possible to facilitate visual identification of whether or not the person captured in a plurality of first images is the same person who is captured in a plurality of second images.

Second Modification Example

In the embodiment, the explanation is given for an example in which the sizes of the face of a person captured in the images is considered to be the first parameters and the second parameters. In contrast, in a first modification example, the explanation is given for an example in which the expressions of a person captured in the images is considered to be the first parameters and the second parameters.

In this case, the extractor 15 extracts a face area from each of a plurality of first areas and sets the degree of smile of that face area as the first parameter. In an identical manner, the extractor 15 extracts a face area from each of a plurality of second areas and sets the degree of smile of that face area as the first parameter. Herein, the degree of smile represents the numerical conversion of the facial expression including expressionlessness or a smile. The degree of smile can be extracted by implementing a known method.

Figures 12, 13:
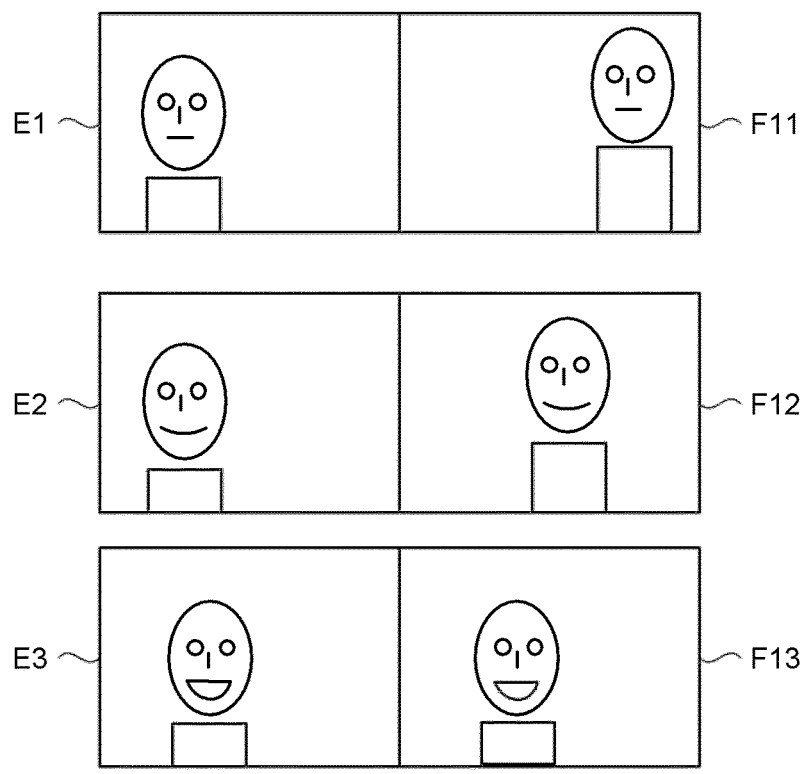
FIG. 12 is a diagram illustrating an example of first parameters according to a second modification example.
FIG. 13 is a diagram illustrating an output example according to the second modification example.

FIG. 12 is a diagram illustrating an example of first parameters according to the second modification example. In the example illustrated in FIG. 12, each parameter represents information in which an image number, which represents the identifier of a source image for extraction of the face area, is associated to the extraction result of the degree of smile of that face area. Herein, "s" represents the degree of smile.

Herein, the search unit 17 and the associate unit 19 can perform operations in an identical manner to the operations explained earlier in the embodiment.

FIG. 13 is a diagram illustrating an output example according to the second modification example. In the example illustrated in FIG. 13, the output controller 21 instructs the output unit 23 to sequentially output, on a screen, an image in which the first image having a first image number E1 and the second image having a second image number F11 that are associated to each other by the associate unit 19 are arranged side by side; an image in which the first image having a first image number E2 and the second image having a second image number F12 that are associated to each other by the associate unit 19 are arranged side by side; and an image in which the first image having a first image number E3 and the second image having a second image number F13 that are associated to each other by the associate unit 19 are arranged side by side, in that sequence (in the first chronological order).

As a result, it becomes possible to output images that include the changes in the facial expression of a person captured in a plurality of first images and include the changes in the facial expression of a person captured in a plurality of second images. Hence, it becomes possible to facilitate visual identification of whether or not the person captured in a plurality of first images is the same person who is captured in a plurality of second images.

Third Modification Example

In the embodiment, the explanation is given for an example in which the sizes of the face of a person captured in the images is considered to be the first parameters and the second parameters. In contrast, in a third modification example, the explanation is given for an example in which the relative positions of the feet of a person captured in the images are considered to be the first parameters and the second parameters.

In this case, the extractor 15 extracts a feet area from each of a plurality of first areas and sets the relative position of the feet area with respect to the ground as the first parameter. In an identical manner, the extractor 15 extracts a feet area from each of a plurality of second areas and sets the relative position of the feet area with respect to the ground as the second parameter. Meanwhile, the relative position of the feet area with respect to the ground can be extracted by implementing, for example, the method disclosed in reference literature 1 or reference literature 2 mentioned above.

Figures 14, 15:
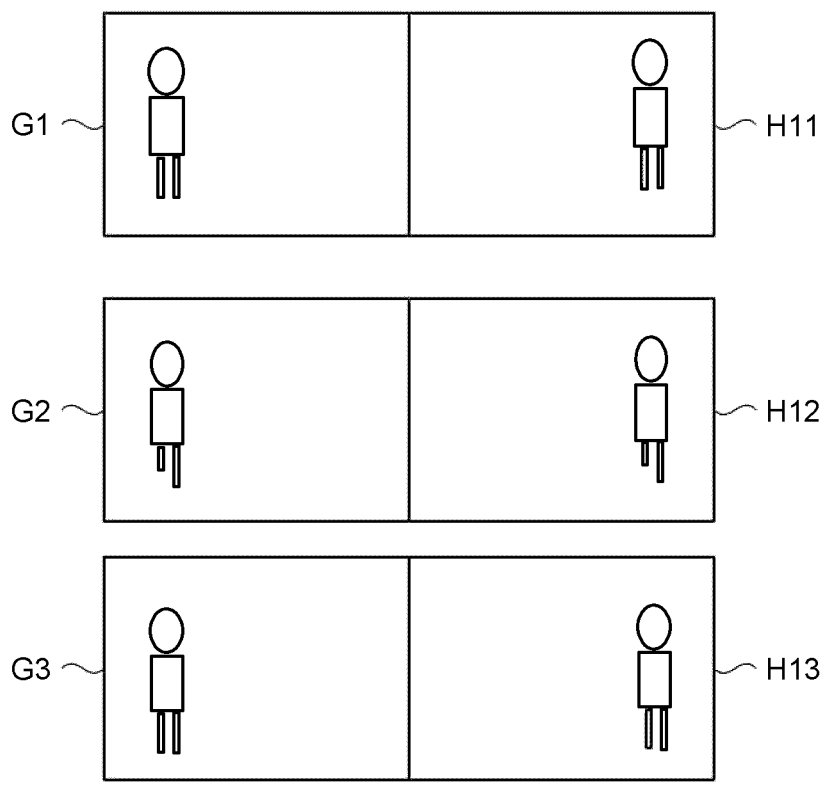
FIG. 14 is a diagram illustrating an example of first parameters according to a third modification example.
FIG. 15 is a diagram illustrating an output example according to the third modification example.

FIG. 14 is a diagram illustrating an example of first parameters according to the third modification example. In the example illustrated in FIG. 14, each parameter represents information in which an image number, which represents the identifier of a source image for extraction of the feet area, is associated to the extraction result of the relative position of the feet area with respect to the ground. Herein, "d" represents the relative position of the feet area with respect to the ground.

Meanwhile, the search unit 17 and the associate unit 19 can perform operations in an identical manner to the operations explained earlier in the embodiment.

FIG. 15 is a diagram illustrating an output example according to the third modification example. In the example illustrated in FIG. 15, the output controller 21 instructs the output unit 23 to sequentially output, on a screen, an image in which the first image having a first image number G1 and the second image having a second image number H11 that are associated to each other by the associate unit 19 are arranged side by side; an image in which the first image having a first image number G2 and the second image having a second image number H12 that are associated to each other by the associate unit 19 are arranged side by side; and an image in which the first image having a first image number G3 and the second image having a second image number H13 that are associated to each other by the associate unit 19 are arranged side by side, in that sequence (in the first chronological order).

As a result, it becomes possible to output images that include the walking of a person captured in a plurality of first images and include the walking of a person captured in a plurality of second images. Hence, it becomes possible to facilitate visual identification of whether or not the person captured in a plurality of first images is the same person who is captured in a plurality of second images.

Meanwhile, in the third modification example, the explanation is given for a case in which the relative positions of the feet of a person captured in the images are considered to be the first parameters and the second parameters. Alternatively, even in the case when the relative positions of the hands of a person captured in the images are considered to be the first parameters and the second parameters, images including the walking of the person can be output in an identical manner.

Fourth Modification Example

In the description according to the embodiment and the description according to the first to third modification examples, a second parameter for which the distance, which represents the degree of similarity, to a first parameter is the shortest is considered to be the second parameter similar to that first parameter. However, alternatively, a second parameter for which the distance, which represents the degree of similarity, to a first parameter is not only the shortest but is also is equal to or smaller than a threshold value is considered to be the second parameter similar to that first parameter.

Accordingly, the search unit 17 can be configured to search among a plurality of second parameters for the second parameter for which the distance, which represents the degree of similarity, to a first parameter is not only the shortest but is also is equal to or smaller than a threshold value.

However, in this case, if there is no second parameter for which the distance, which represents the degree of similarity, to the first parameter is equal to or smaller than the threshold value; then the search unit 17 cannot retrieve the second parameter.

For that reason, the associate unit 19 generates a supplemental image with the use of the source second images for extraction of such second parameters which are retrieved with respect to first parameters that are extracted from other first images which, in the first chronological order, are present previous and subsequent to the source first image for extraction of a first parameter with respect to which no second parameter was retrieved that has the distance, which represents the degree of similarity, to the first parameter equal to or smaller than the threshold value. Then, the associate unit 19 associates the first image with the supplemental image.

Figure 16:
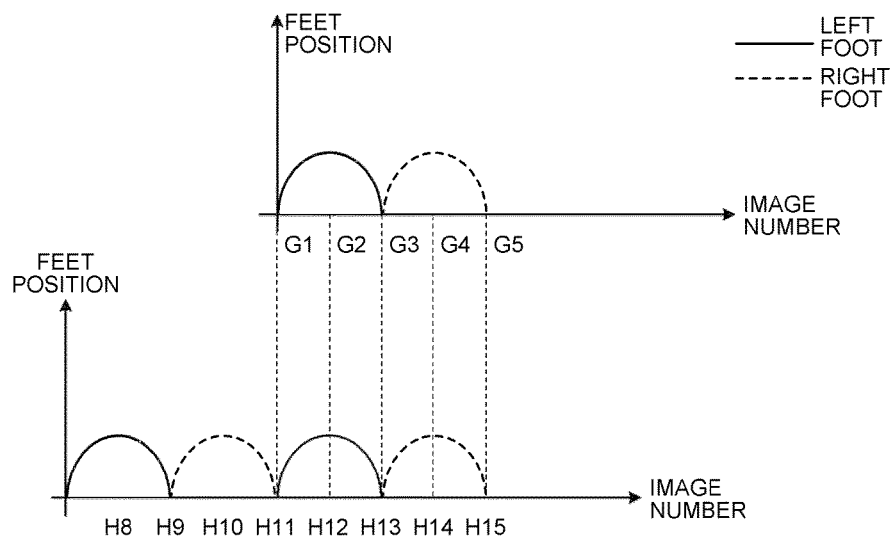
FIG. 16 is a diagram illustrating an example of the result of associating the first images and the second images according to a fourth modification example.

FIG. 16 is a diagram illustrating an example of the result of associating the first images and the second images according to the fourth modification example. In the example illustrated in FIG. 16, it is assumed that, with respect to the first parameters extracted from the first images having first image numbers G1, G2, G3, and G5; the search unit 17 retrieves the second parameters extracted from the second images having second image numbers H11, H12, H13, and H15, respectively. However, it is assumed that, with respect to the first parameter extracted from the first image having a first image number G4, the search unit 17 does not retrieve any second parameter.

In this case, the associate unit 19 associates the first images having the first image numbers G1, G2, G3, and G5 with the second images having the second image numbers H11, H12, H13, and H15, respectively. Moreover, the associate unit 19 makes use of the second image having the second image number H13 that is the source second image for extraction of the second parameter retrieved with respect to the first parameter that was extracted from the first image which has the first image number G3 and which is previous or subsequent in the first chronological order to the first image having the first image number G4; makes use of the second image having the second image number H15 that is the source second image for extraction of the second parameter retrieved with respect to the first parameter that was extracted from the first image which has the first image number G5 and which is previous or subsequent in the first chronological order to the first image having the first image number G4; and generates a supplemental image having a second image number H14. Then, the associate unit 19 associates the first image having the first image number G4 with the supplemental image having the second image number H14.

Subsequently, the output controller 21 instructs the output unit 23 to sequentially output, in the first chronological order or in the second chronological order, images based on the sets of a first image and a second image that are associated to each other and images based on the sets of the first images and the supplemental images that are associated to each other.

Fifth Modification Example

In the description according to the embodiment and the description according to the first to fourth modification examples, each of a plurality of first images is associated with a second image that includes a similar parameter. However, alternatively, from among a plurality of first images, only a predetermined first image can be associated with a second image that includes a similar parameter. Then, each other first image other than the predetermined first image can be associated to a second image that is shifted from the abovementioned associated second image by the number of frames equal to the number of frames between the other first image and the predetermined first image.

In this case, from among a plurality of first images, the extractor 15 can extract the first parameter from the predetermined first image.

The associate unit 19 can associate the predetermined first image, from which the first parameter was extracted, with the source second image for extraction of the second parameter retrieved with respect to the abovementioned first parameter. Moreover, the associate unit 19 can associate each other first image other than the predetermined first image with a second image that is shifted from the abovementioned associated second image by the number of frames equal to the number of frames between the other first image and the predetermined first image.

Figure 17:
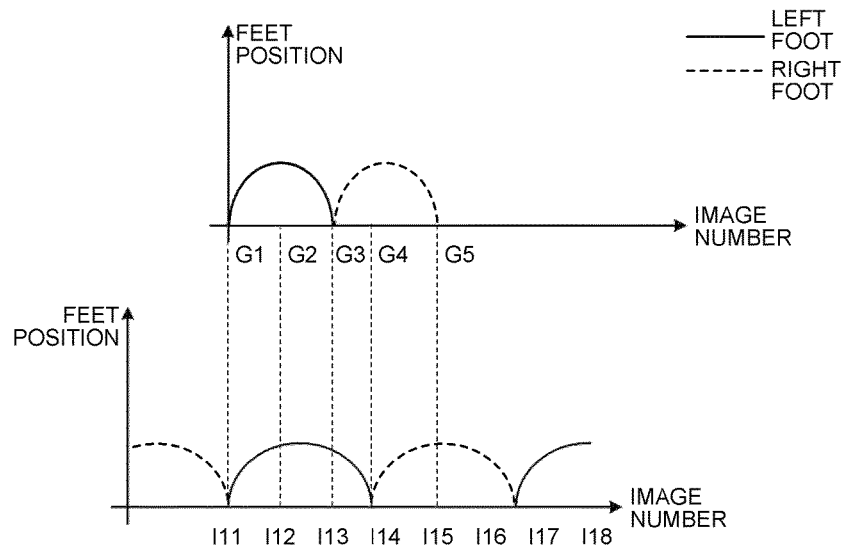
FIG. 17 is a diagram illustrating an example of the result of associating the first images and the second images according to a fifth modification example.

FIG. 17 is a diagram illustrating an example of the result of association between the first images and the second images according to the fifth modification example. In the example illustrated in FIG. 17, the first image having the first image number G1, which is the predetermined first image from which the first parameter was extracted, is associated with the second image having a second image number I11, which is the source second image for extraction of the second parameter retrieved with respect to the first parameter. Moreover, to the first image having the first image number G2 is associated the second image having a second image number I12 that is shifted from the second image having the second image number I11 by the number of frames equal to the number of frames (a single frame) between the first image having the first image number G1 and the first image having the first image number G2. In an identical manner, to the first image having the first image number G3 is associated the second image having a second image number I13; to the first image having the first image number G4 is associated the second image having a second image number I14; and to the first image having the first image number G5 is associated the second image having a second image number I15.

Then, the output controller 21 instructs the output unit 23 to sequentially output, in the first-chronological order or in the second chronological order, the images based on the sets of a first image and a second image that are associated to each other.

As a result, it becomes possible to output images that include a particular point of time during the movements (for example, the start of a movement or the end of a movement) captured in a plurality of first images and includes a particular point of time during the movements captured in a plurality of second images. Hence, it becomes possible to facilitate visual identification of whether or not the person captured in a plurality of first images is the same person who is captured in a plurality of second images.

Hardware Configuration

Figure 18:
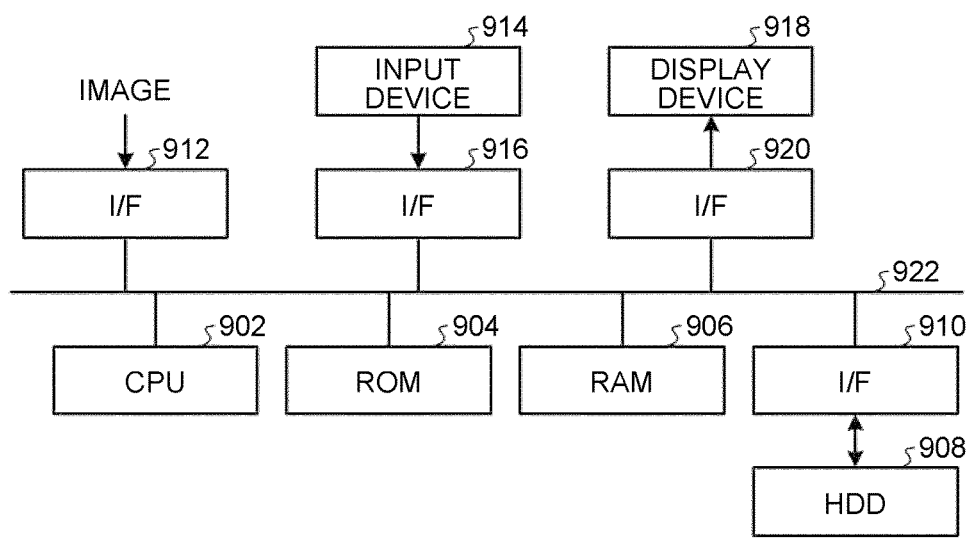
FIG. 18 is a diagram illustrating an exemplary hardware configuration of the image output device according to the embodiment and the modification examples.

FIG. 18 is a diagram illustrating an exemplary hardware configuration of the image output device 10 according to the embodiment and the modification examples described above. As illustrated in FIG. 18, the image output device 10 according to the embodiment and the modification examples described above has the hardware configuration of a general-purpose computer that includes a central processing unit (CPU) 902; a random access memory (RAM) 906; a read only memory (ROM) 904 that is used to store computer programs; a hard disk drive (HDD) 908; an I/F 910 that serves as the interface with the HDD 908; an I/F 912 that serves as the interface for the purpose of image input; an input device 914 such as a mouse or a keyboard; an I/F 916 that serves as the interface with the input device 914; a display device 918 such as a display; an I/F 920 that serves as the interface with the display device 918; and a bus 922. Herein, the CPU 902, the ROM 904, the RAM 906, the I/F 910, the I/F 912, the I/F 916, and the I/F 920 are connected to each other via the bus 922.

In the image output device 10 according to the embodiment and the modification examples described above, the CPU 902 reads computer programs from the ROM 904, and runs the computer programs by loading them in the RAM 906. As a result, the abovementioned constituent elements are implemented in the computer. Then, in the image output device 10 according to the embodiment and the modification examples described above, the CPU 902 makes use of the information stored in the HDD 908 and associates the first images and the second images that are input via the I/F 912.

Meanwhile, the computer programs can also be stored in the HDD 908. Alternatively, the computer programs can be recorded in the form of installable or executable files in a computer-readable recording medium such as a compact disk read only memory (CD-ROM), a compact disk readable (CD-R), a memory card, a digital versatile disk (DVD), or a flexible disk (FD); and can be provided as a computer program product. Still alternatively, the computer programs can be saved as downloadable files on a computer connected to the Internet or can be made available for distribution through a network such as the Internet.

For example, unless contrary to the nature thereof, the steps of the flowcharts according to the embodiments described above can have a different execution sequence, can be executed in plurality at the same time, or can be executed in a different sequence every time.

As described above, according to the embodiment and the modification examples described above, it becomes possible to facilitate visual identification of whether or not it is the same mobile object that is captured in a plurality of images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image output device, comprising:
a memory; and one or more processing circuits configured to function as an acquirer, an extractor, a search unit, an associate unit and an output controller, wherein the acquirer acquires a plurality of first images obtained by capturing a mobile object and a plurality of second images obtained by capturing the mobile object;

the extractor extracts a first parameter that varies in accordance with a movement of the mobile object from at least one of the first images, and extracts a second parameter that varies in accordance with a movement of the mobile object from each of the second images;

the search unit searches the second parameters for a second parameter that is similar to the first parameter;

the associate unit associates the first image from which the first parameter is extracted with the second image from which the second parameter that is retrieved with respect to the first parameter is extracted and to associate another first image other than the first image with another second image that is shifted from the second image by a number of frames between the another first image and the first image from which the first parameter is extracted; and the output controller instructs an output unit to output an image based on the first image and the second image that are associated to each other.

2. The device according to claim 1, wherein the search unit searches the second parameters for a second parameter for which a distance representing a degree of similarity with the first parameter is largest.

3. The device according to claim 2, wherein the search unit searches the second parameters for a second parameter for which the distance is shortest and equal to or smaller than a threshold value.

4. The device according to claim 3, wherein the associate unit generates a supplemental image using the first image from which the first parameter with respect to which the second parameter for which the distance is equal to or smaller than the threshold value is not retrieved is extracted and using the second image from which the second parameter that is retrieved with respect to the first parameter extracted from another first image which is previous or subsequent to the first image in the first chronological order is extracted, and associate the first image with the supplemental image, and the output controller instructs the output unit to sequentially output, in the first chronological order, images each of which is based on a set of the first image and the second image that are associated to each other and images each of which is based on a set of the first image and the supplemental image that are associated to each other.

5. The device according to claim 1, wherein the mobile object is a person, and the first parameter and the second parameter are parameters related to a part of body of the person.

6. The device according to claim 5, wherein the first parameter and the second parameter represent at least one of a size of a part of the body in an image, an orientation of a part of the body in an image, and a relative position of a part of the body in an image.

7. The device according to claim 5, wherein a part of the body indicates at least one of face, feet, whole body, upper body, lower body, hand, and arm.

8. The device according to claim 1, wherein the image based on the first image and the second image is an image in which the first image and the second image are arranged next to each other.

9. The device according to claim 1, wherein the first image is captured in a first chronological order and the second image is captured in a second chronological order, the output controller causes an image based on the first image and the second image that are associated to each other to output to the output unit.

10. An image output method employed in an image output device, comprising:

acquiring a plurality of first images obtained by capturing a mobile object and a plurality of second images obtained by capturing the mobile object;

extracting a first parameter that varies in accordance with a movement of the mobile object from at least one of the first images, and extracting a second parameter that varies in accordance with a movement of the mobile object from each of the second images;

searching the second parameters for a second parameter that is similar to the first parameter;

associating the first image from which the first parameter is extracted with the second image from which the second parameter that is retrieved with respect to the first parameter is extracted and associating another first image other than the first image with another second image that is shifted from the second image by a number of frames between the another first image and the first image from which the first parameter is extracted; and instructing an output unit to output an image based on the first image and the second image that are associated to each other.

11. The method according to claim 10, wherein the first image is captured in a first chronological order and the second image is captured in a second chronological order, the instructing includes causing an image based on the first image and the second image that are associated to each other to output to the output unit.

12. The method according to claim 10, wherein the searching includes searching the second parameters for a second parameter for which a distance representing a degree of similarity with the first parameter is largest.

13. The method according to claim 12, wherein the searching includes searching the second parameters for a second parameter for which the distance is shortest and equal to or smaller than a threshold value.

14. The method according to claim 13, wherein the associating includes generating a supplemental image using the first image from which the first parameter with respect to which the second parameter for which the distance is equal to or smaller than the threshold value is not retrieved is extracted and using the second image from which the second parameter that is retrieved with respect to the first parameter extracted from another first image which is previous or subsequent to the first image in the first chronological order is extracted, and associating the first image with the supplemental image, and the instructing includes instructing the output unit to sequentially output, in the first chronological order, images each of which is based on a set of the first image and the second image that are associated to each other and images each of which is based on a set of the first image and the supplemental image that are associated to each other.

15. A computer program product comprising a non-transitory computer-readable medium containing a program executed by a computer, the program causing the computer to execute:
  acquiring a plurality of first images obtained by capturing a mobile object and a plurality of second images obtained by capturing the mobile object;
  extracting a first parameter that varies in accordance with a movement of the mobile object from at least one of the first images, and extracting a second parameter that varies in accordance with a movement of the mobile object from each of the second images;
  searching the second parameters for a second parameter that is similar to the first parameter;
  associating the first image from which the first parameter is extracted with the second image from which the second parameter that is retrieved with respect to the first parameter is extracted and associating another first image other than the first image with another second image that is shifted from the second image by a number of frames between the another first image and the first image from which the first parameter is extracted; and
  instructing an output unit to output an image based on the first image and the second image that are associated to each other.

\* \* \* \* \*